(12) United States Patent
Godoy et al.

(10) Patent No.: US 7,945,122 B2
(45) Date of Patent: May 17, 2011

(54) METHOD, SYSTEM, AND PROGRAM PRODUCT FOR PROCESSING AN ELECTRONIC DOCUMENT

(75) Inventors: Glenn C. Godoy, Endwell, NY (US);
Mark A. Musa, Brackney, PA (US);
Amy J. Snavely, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 1266 days.

(21) Appl. No.: 11/535,531

(22) Filed: Sep. 27, 2006

(65) Prior Publication Data

US 2008/0077860 A1    Mar. 27, 2008

(51) Int. Cl.
*G06K 9/54* (2006.01)
*G06F 17/00* (2006.01)

(52) U.S. Cl. .................................. 382/305; 715/273

(58) Field of Classification Search ............ 382/305, 382/307, 100; 705/1; 707/100, 1, 2; 715/273, 715/200

See application file for complete search history.

(56) References Cited

U.S. PATENT DOCUMENTS

| | | | |
|---|---|---|---|
| 6,028,997 A | 2/2000 | Leymann et al. | |
| 6,449,659 B1 | 9/2002 | Caron et al. | |
| 6,546,396 B1 | 4/2003 | Borkowski et al. | |
| 6,718,534 B1 | 4/2004 | Carter et al. | |
| 7,143,091 B2 * | 11/2006 | Charnock et al. ............ | 1/1 |
| 2002/0073161 A1 * | 6/2002 | Yamazaki et al. ............ | 709/206 |
| 2005/0257126 A1 * | 11/2005 | Hagiuda et al. ............ | 715/500 |
| 2005/0262119 A1 | 11/2005 | Mawdsley | |
| 2006/0087674 A1 * | 4/2006 | Lusen et al. ............ | 358/1.14 |

* cited by examiner

*Primary Examiner* — Yon Couso
(74) *Attorney, Agent, or Firm* — William E. Schiesser; Hoffman Warnick LLC

(57) ABSTRACT

The invention provides a method, system, and program product for processing an electronic document. In one embodiment, the invention includes determining a procedure applicable to the electronic document; defining at least one step of the procedure; in the case that the at least one step includes a plurality of steps, determining an order of the plurality of steps; determining whether the at least one step applies to the electronic document; applying an algorithm for carrying out the at least one step; applying a completion algorithm; determining whether the procedure includes an additional step for which an algorithm has not been applied; and in the case that the procedure includes an additional step for which an algorithm has not been applied: determining whether the additional step applies to the electronic document; applying an algorithm for carrying out the additional step; and applying a completion algorithm.

20 Claims, 3 Drawing Sheets

METHOD, SYSTEM, AND PROGRAM PRODUCT FOR PROCESSING AN ELECTRONIC DOCUMENT

BACKGROUND OF THE INVENTION

1. Technical Field

The invention relates generally to document processing, and more particularly, to a method, system, and program product for processing an electronic document.

2. Background Art

Electronic documents (e.g., text files, hypertext markup language (HTML) files, electronic mail (email) messages, transactions requiring processing, etc.) are commonly used to store, transfer, communicate, and/or share information between and among individuals and/or groups. In some circumstances, an electronic document prepared by one individual will be further processed by a computer software program. For example, an individual may prepare an electronic document requesting that a vendor of goods or services be paid for those goods or services. This electronic document may then be processed by a software program operable to read, parse, or otherwise utilize all or portions of the document and forward them to various managers or departments for comment and/or action.

The electronic document may be prepared within such a software program or using a different program or system. It may be inconvenient or impracticable for all individuals or groups involved in the preparation or processing of an electronic document to use the same software program, particularly where such individuals or groups are members of different companies or organizations. However, if a different program or system is used, the computer software program used to process the electronic document must either recognize the type of electronic document prepared or be capable of converting the electronic document to a recognizable type. This may require a great deal of coordination and/or expense by the individuals or groups.

Accordingly, there exists a need in the art to overcome the deficiencies and limitations described hereinabove.

SUMMARY OF THE INVENTION

The invention provides a method, system, and program product for processing an electronic document. In one embodiment, the invention includes determining a procedure applicable to the electronic document; defining at least one step of the procedure; in the case that the at least one step includes a plurality of steps, determining an order of the plurality of steps; determining whether the at least one step applies to the electronic document; applying an algorithm for carrying out the at least one step; applying a completion algorithm; determining whether the procedure includes an additional step for which an algorithm has not been applied; and in the case that the procedure includes an additional step for which an algorithm has not been applied: determining whether the additional step applies to the electronic document; applying an algorithm for carrying out the additional step; and applying a completion algorithm.

A first aspect of the invention provides a method for processing an electronic document, the method comprising: determining a procedure applicable to the electronic document; defining at least one step of the procedure; determining whether the at least one step applies to the electronic document; applying an algorithm for carrying out the at least one step; and applying a completion algorithm.

A second aspect of the invention provides a system for processing an electronic document, comprising: a system for determining a procedure applicable to the electronic document; a system for defining at least one step of the procedure; a system for determining whether the at least one step applies to the electronic document; a system for applying an algorithm for carrying out the at least one step; and a system for applying a completion algorithm.

A third aspect of the invention provides a program product stored on a computer-readable medium, which when executed, processes an electronic document, the program product comprising: program code for determining a procedure applicable to the electronic document; program code for defining at least one step of the procedure; program code for determining whether the at least one step applies to the electronic document; program code for applying an algorithm for carrying out the at least one step; and program code for applying a completion algorithm.

A fourth aspect of the invention provides a method for deploying an application for processing an electronic document, the method comprising: providing a computer infrastructure being operable to: determine a procedure applicable to the electronic document; define at least one step of the procedure; determine whether the at least one step applies to the electronic document; apply an algorithm for carrying out the at least one step; and apply a completion algorithm.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a method, system, and program product for processing an electronic document. As noted above, "document," as used herein, is broadly defined to include any number of devices operable to store, transfer, communicate, and/or share information, including, for example, text files, hypertext markup language (HTML) files, electronic mail (email) messages, etc.

Figure 1:
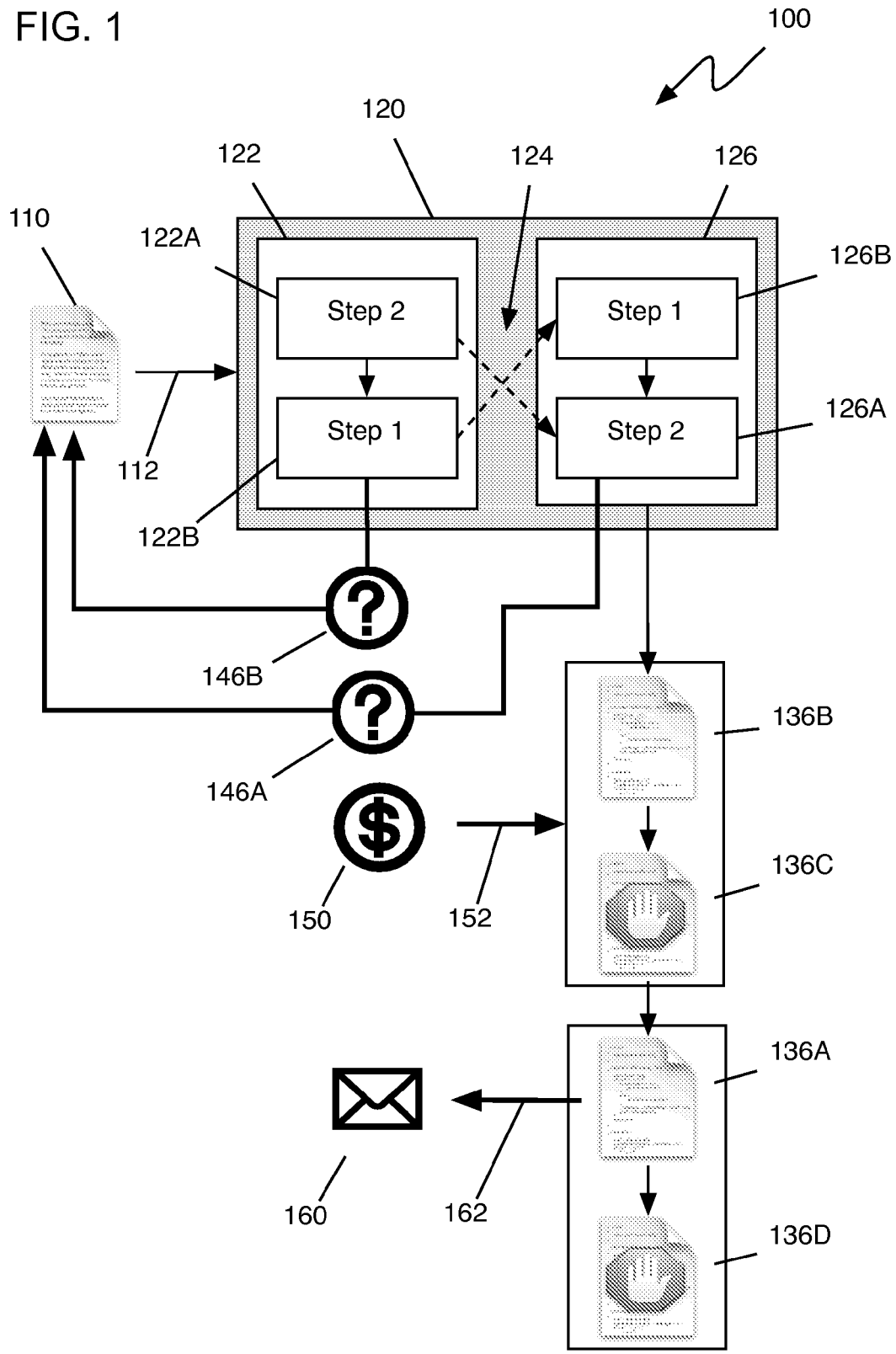
FIG. 1 shows a diagram of an electronic document processed according to an embodiment of the invention.

Turning to the drawings, FIG. 1 shows a process 100 in which an electronic document 110 is processed according to an embodiment of the invention. Electronic document 110 may be submitted 112 to an analyzer 120. Analyzer 120 may then determine a procedure 122 applicable to the processing of electronic document 110. As shown, procedure 122 includes two steps 122A, 122B. It is possible, of course, that such a procedure may include only one step. It is also possible that such a procedure may include many more steps, procedure 122 being shown including two steps 122A, 122B for purposes of brevity and illustration only. The steps of a procedure determined by analyzer 120 may be predefined or, optionally, may be defined by analyzer 120.

By processing electronic document 110 using a procedure 122 comprising one or more steps 122A, 122B, analyzer 120 may be used to process electronic documents of virtually any type. For example, an individual step within a process may include instructions to strip from the electronic document raw information or may include instructions to convert the electronic document from one format to another. Other methods and devices for utilizing electronic documents of various formats or types will also be recognized by one having skill in the art. Thus, electronic document 110 may be prepared using any number of software programs or systems.

In the case that procedure 122 includes more than one step, analyzer 120 may optionally reorder 124 the steps of the procedure such that the reordered procedure 126 is more appropriate and/or includes a more preferred ordering of steps 126A, 126B. For example, while both steps 122A, 122B of procedure 122 may be applicable to the processing of electronic document 110, step 122A may be dependent upon the successful completion of step 122B. In such a case, the steps 126B, 126A are reversed in reordered procedure 126. It may also be the case that individual steps within a procedure are provided in no order, in which case they may be ordered.

In addition, whether before or after reordering 124, it may be determined 146B, 146A whether the steps 122B, 126A are applicable to electronic document 110. For example, where an electronic document comprises a request for payment, one step of a procedure chosen for processing the electronic document may be "obtain supervisor approval." If, however, the electronic document has been prepared and/or submitted by an individual having no supervisor (e.g., the individual is him/herself a supervisor authorized to approve such a request), the "obtain supervisor approval" step is inapplicable to the electronic document and may be omitted from the procedure. In addition, such a determination may include a determination of whether the step is mandatory or optional, as applied to electronic document 110.

Once a process is determined and its steps defined and, optionally, ordered or reordered, the procedure is "run" by applying an algorithm 136B, 136A operable to carry out the functions of the steps. For example, continuing with the example above, wherein electronic document 110 comprises a request for payment, "step 1" 126B may include an instruction to obtain approval from a supervisor 150. Thus, algorithm 136B may include instructions (e.g., computer code) to notify the supervisor 150 of the request and await his/her approval 152. Once such approval 152 is obtained, a completion algorithm 136C is applied, marking completion of "step 1" 126B. Completion algorithm 136C may include, for example, an instruction to continue on to the next step in the procedure, in the case that the procedure includes subsequent steps.

As shown in FIG. 1, "step 2" 126A follows "step 1" 126B in reordered process 126, so algorithm 136A is applied following completion of algorithm 136C. "Step 2" 126A may include an instruction to notify the preparer of electronic document 110 that approval 152 has been obtained via an email message 160 or other electronic communication (e.g., fax, text message, etc.). Thus, algorithm 136A may include instructions to compose and send 162 such an email message 160, which may include, as necessary, the details of approval 152 (e.g., amount approved, date/time approved, etc.). Completion algorithm 136D is applied after algorithm 136A has been applied. In FIG. 1, no additional steps follow "step 2" 126A. As such, completion algorithm 136D may simply mark the completion of steps in reordered procedure 126.

Figure 2:
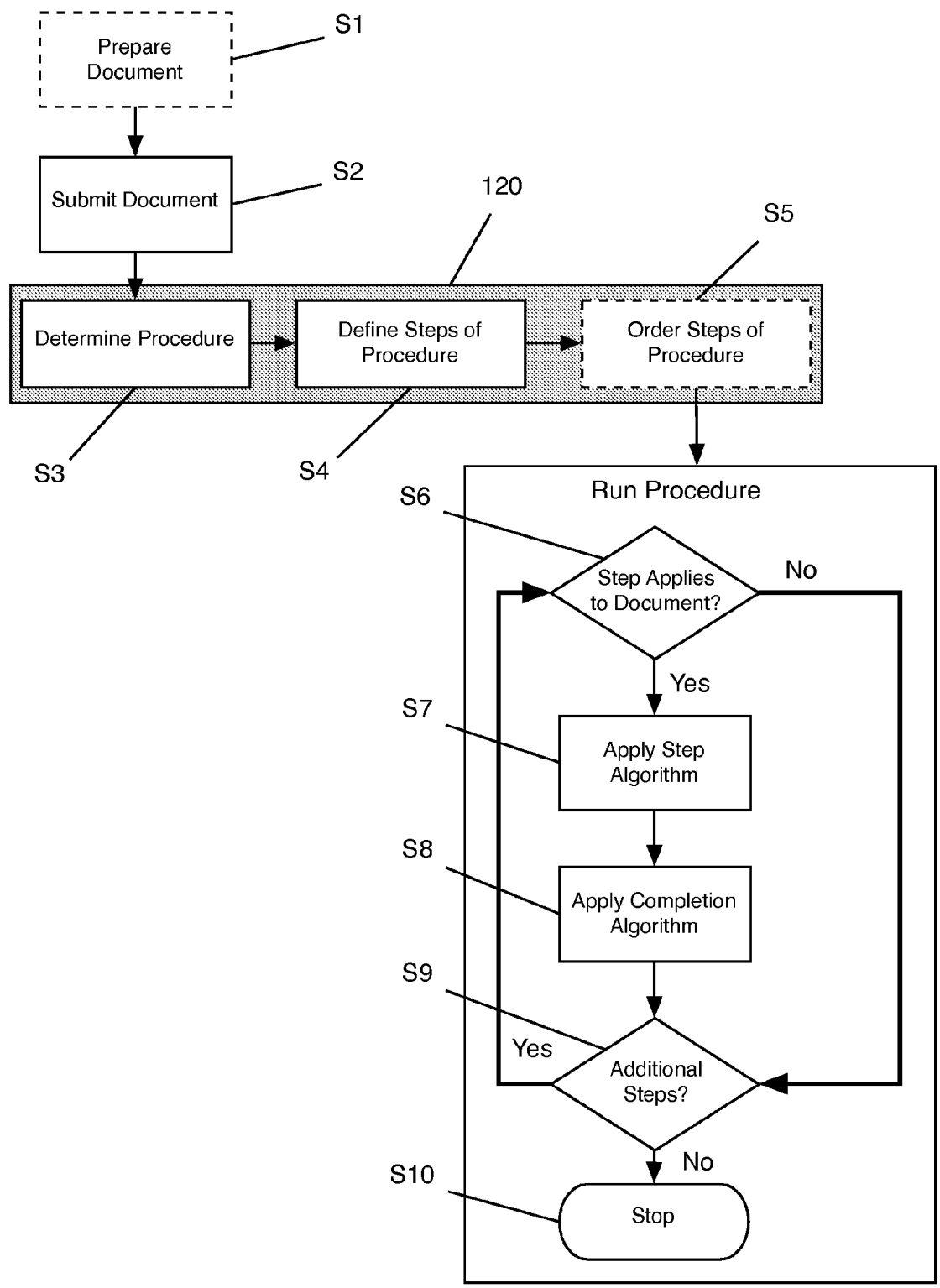
FIG. 2 shows a flow diagram of an illustrative method according to the invention.

Referring now to FIG. 2, and with continued reference to FIG. 1, a flow diagram of an illustrative method according to the invention is shown. At optional step S1, an electronic document 110 is prepared. Such preparation is not essential, as the present invention may be applied to existing electronic documents. At step S2, the electronic document 110 is submitted 112 to an analyzer 120. Within the analyzer 120, a procedure applicable to the electronic document 110 is determined at step S3 and its steps defined at step S4. At optional step S5, the steps defined at step S4 are ordered or reordered 124.

At step S6, it is determined 146B whether a step of the procedure is applicable to the electronic document 110. As noted above, such a determination may be made before or after the steps are ordered or reordered 124 at step S5. If the step is inapplicable to the electronic document 110 (i.e., "No" at step S6), it is determined at step S9 whether the procedure includes additional steps. If the step is applicable to the electronic document 110 (i.e., "Yes" at step S6), an algorithm operable to carry out the step is applied at step S7. At step S8, a completion algorithm is applied. As noted above, the completion algorithm may include an instruction to proceed to a subsequent step in the procedure.

At step S9, it is determined whether the procedure includes additional steps. If so, (i.e., "Yes" at step S9), steps S6 through S9 may be iteratively looped. If not, (i.e., "No" at step S9), the procedure may be stopped at step S10.

Figure 3:
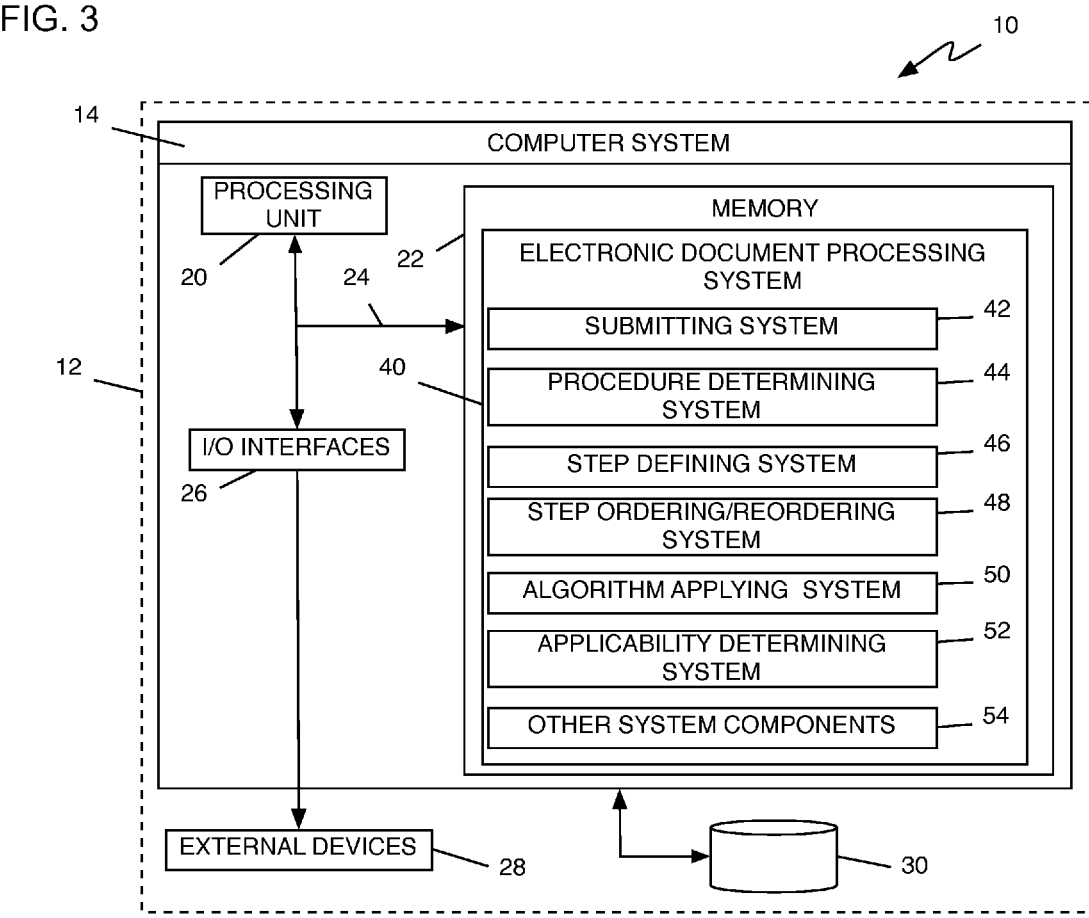
FIG. 3 shows a block diagram of an illustrative system according to the invention.

FIG. 3 shows an illustrative system 10 for processing an electronic document. To this extent, system 10 includes a computer infrastructure 12 that can perform the various process steps described herein for processing an electronic document. In particular, computer infrastructure 12 is shown including a computer system 14 that comprises an electronic document processing system 40, which enables computer system 14 to process an electronic document by performing the process steps of the invention.

Computer system 14 is shown including a processing unit 20, a memory 22, an input/output (I/O) interface 26, and a bus 24. Further, computer system 14 is shown in communication with external devices 28 and a storage system 30. As is known in the art, in general, processing unit 20 executes computer program code, such as electronic document processing system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and electronic document processing system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/ software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, electronic document processing system 40 enables computer system 14 to process an electronic document. To this extent, electronic document processing system 40 is shown including a submitting system 42, a procedure determining system 44, a step defining system 46, a step ordering/reordering system 48, an algorithm applying system 50, and an applicability determining system 52. Operation of each of these systems is discussed above. Electronic document processing system 40 may further include other system components 54 to provide additional or improved functionality to electronic document processing system 40. It is understood that some of the various systems shown in FIG. 3 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for processing an electronic document, it is understood that the invention further provides various alternative embodiments. For example, in one embodiment, the invention provides a computer-readable medium that includes computer program code to enable a computer infrastructure to process an electronic document. To this extent, the computer-readable medium includes program code, such as electronic document processing system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to process an electronic document as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for processing an electronic document. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for processing an electronic document, the method comprising:
   submitting the electronic document to an analyzer, the analyzer employing a computer for:
      determining a procedure applicable to the electronic document;
      defining at least one step of the procedure; and
      determining whether the at least one step of the procedure applies to the electronic document;
   applying an algorithm for carrying out the at least one step of the procedure; and
   applying a completion algorithm to mark completion of the at least one step of the procedure.

2. The method of claim 1, wherein, in the case that the at least one step includes a plurality of steps, the method further comprises:
   determining an order of the plurality of steps.

3. The method of claim 2, wherein applying the completion algorithm includes applying a separate completion algorithm subsequent to applying each algorithm for carrying out each of the plurality of steps.

4. The method of claim 3, wherein at least one of the separate completion algorithms includes an instruction to apply an algorithm for carrying out a subsequent step of the procedure.

5. The method of claim 1, further comprising:
   determining whether the procedure includes an additional step for which an algorithm has not been applied; and
   in the case that the procedure includes an additional step for which an algorithm has not been applied:
      determining whether the additional step applies to the electronic document; and
      in the case that the additional step applies to the electronic document:
         applying an algorithm for carrying out the additional step of the procedure; and
         applying the completion algorithm.

6. The method of claim 1, wherein determining whether the at least one step applies to the electronic document includes determining whether the at least one step is mandatory or optional.

7. A system for processing an electronic document, comprising:
   an analyzing system including a computer for:
      determining a procedure applicable to the electronic document;
      defining at least one step of the procedure; and
      determining whether the at least one step of the procedure applies to the electronic document;
   a system for applying an algorithm for carrying out the at least one step of the procedure; and
   a system for applying a completion algorithm to mark completion of the at least one step of the procedure.

8. The system of claim 7, further comprising:
   a system for determining an order of a plurality of steps of the procedure.

9. The system of claim 8, wherein the system for applying the completion algorithm includes a system for applying a separate completion algorithm subsequent to applying each algorithm for carrying out each of the plurality of steps.

10. The system of claim 9, wherein at least one completion algorithm includes an instruction to apply an algorithm for carrying out a subsequent step of the procedure.

11. The system of claim 7, further comprising:
   a system for determining whether the procedure includes an additional step for which an algorithm has not been applied;
   a system for determining whether the additional step of the procedure applies to the electronic document; and
   a system for applying an algorithm for carrying out the additional step of the procedure.

12. The system of claim 7, wherein the system for determining whether the at least one step applies to the electronic document includes a system for determining whether the at least one step is mandatory or optional.

13. A computer-readable storage medium including a program product, which when executed, processes an electronic document, the program product comprising:
   program code for determining a procedure applicable to the electronic document;
   program code for defining at least one step of the procedure; and
   program code for determining whether the at least one step of the procedure applies to the electronic document;
   program code for applying an algorithm for carrying out the at least one step of the procedure; and
   program code for applying a completion algorithm to mark completion of the at least one step of the procedure.

14. The computer-readable storage medium of claim 13, wherein the program product further comprises:
   program code for determining an order of the plurality of steps.

15. The computer-readable storage medium of claim 13, wherein the program product further comprises:
   program code for determining whether the procedure includes an additional step for which an algorithm has not been applied;
   program code for determining whether the additional step applies to the electronic document;
   program code for applying an algorithm for carrying out the additional step; and
   program code for applying a completion algorithm.

16. The computer-readable storage medium of claim 13, wherein program code for determining whether the at least one step applies to the electronic document includes program code for determining whether the at least one step is mandatory or optional.

17. A method for deploying an application for processing an electronic document, the method comprising:
   providing a computer infrastructure including a computer being operable to:
      determine a procedure applicable to the electronic document;
      define at least one step of the procedure;
      determine whether the at least one step of the procedure applies to the electronic document;
      apply an algorithm for carrying out the at least one step of the procedure; and
      apply a completion algorithm to mark completion of the at least one step of the procedure.

18. The method of claim 1, wherein the procedure includes processing a request for payment.

19. The method of claim 18, wherein the at least one step of the procedure includes a plurality of steps and at least one step includes converting the electronic document from one format to another format.

20. The method of claim 19, wherein the analyzer further employs the computer for:
   ordering the plurality of steps.

* * * * *